(12) United States Patent
Konishi et al.

(10) Patent No.: US 8,349,972 B2
(45) Date of Patent: Jan. 8, 2013

(54) PAINT COMPOSITIONS, A METHOD OF PAINT FINISHING AND PAINTED OBJECTS

(75) Inventors: Tetsu Konishi, Kanagawa (JP); Shinji Mitsumune, Kanagawa (JP); Hiroyuki Tagkagi, Yokohama (JP); Takehito Ito, Tokyo (JP); Rui Niimi, Münster (DE)

(73) Assignee: BASF Coatings Japan Ltd. (JP)

( * ) Notice: Subject to any disclaimer, the term of this patent is extended or adjusted under 35 U.S.C. 154(b) by 601 days.

(21) Appl. No.: 12/097,117

(22) PCT Filed: Nov. 1, 2006

(86) PCT No.: PCT/IB2006/003197
§ 371 (c)(1),
(2), (4) Date: Jul. 30, 2009

(87) PCT Pub. No.: WO2007/060510
PCT Pub. Date: May 31, 2007

(65) Prior Publication Data
US 2009/0299016 A1    Dec. 3, 2009

(30) Foreign Application Priority Data
Nov. 25, 2005 (JP) ................ 2005-339838

(51) Int. Cl.
C08G 63/08 (2006.01)
C08G 63/20 (2006.01)
C08G 18/42 (2006.01)
C08G 63/06 (2006.01)

(52) U.S. Cl. ........... 525/439; 525/440.1; 525/440.6; 525/440.13

(58) Field of Classification Search .......... 525/125
See application file for complete search history.

(56) References Cited

U.S. PATENT DOCUMENTS

| | | | | |
|---|---|---|---|---|
| 4,005,155 A | * | 1/1977 | Sampson et al. | 525/162 |
| 6,001,931 A | * | 12/1999 | Brahm et al. | 525/123 |
| 6,037,404 A | * | 3/2000 | Dahm et al. | 524/590 |
| 6,037,414 A | * | 3/2000 | Simms et al. | 525/176 |
| 6,652,971 B1 | * | 11/2003 | Delmotte et al. | 428/413 |
| 2003/0119980 A1 | | 6/2003 | Ogawa et al. | |

FOREIGN PATENT DOCUMENTS

| | | |
|---|---|---|
| EP | 1201690 A2 | 5/2002 |
| EP | 1454934 A1 | 9/2004 |
| EP | 1489148 A1 | 12/2004 |
| JP | 05-171103 | 7/1993 |
| JP | 2002-105397 | 4/2002 |
| JP | 2003-313493 | 11/2003 |
| WO | WO2004094515 | 11/2004 |

OTHER PUBLICATIONS

Written Opinion of PCT/IB2006/003197 filed Nov. 1, 2006.
International Search Report of PCT/IB2006/003197 filed Nov. 1, 2006.
International Preliminary Report on Patentability for International Application No. PCT/IB2006/003197 issued May 27, 2008.

* cited by examiner

Primary Examiner — Randy Gulakowski
Assistant Examiner — Mike M Dollinger
(74) Attorney, Agent, or Firm — Cantor Colburn LLP

(57) ABSTRACT

Disclosed herein is a paint composition comprising a hydroxyl group containing resin (A), comprising structural units based on 2,2-dimethylolalkanoic acid, having a hydroxyl group value of from 200 to 400 mgKOH/g, and comprising less than 25 weight % in the resin solid fraction of structural units based on a lactone compound; a hydroxyl group containing resin (B), having a hydroxyl group value from 50 to 200 mgKOH/g, and comprising from 25 to 75 weight % in the resin solid fraction of structural units based on a lactone compound; and a crosslinking agent (C) comprising at least two OH-reactive functional groups per molecule; wherein the resin solid fraction weight ratio (A)/(B) of the hydroxyl group containing resin (A) and the hydroxyl group containing resin (B) is from 90/10 to 10/90.

9 Claims, No Drawings

PAINT COMPOSITIONS, A METHOD OF PAINT FINISHING AND PAINTED OBJECTS

CROSS REFERENCE TO RELATED APPLICATIONS

This Application is the National Stage of International Application No. PCT/IB2006/003197, filed Nov. 1, 2006, which claims priority to Japanese Application No. 2005-339838, filed Nov. 25, 2005.

TECHNICAL FIELD

The invention concerns novel paint compositions, a method of paint finishing and the resulting painted objects. More precisely, the invention concerns paint compositions and a method of paint finishing with which paint films which have excellent car-wash scratching resistance, acid resistance, staining resistance, water resistance, weather resistance and appearance can be obtained in the automobile painting field, and the resulting painted objects.

BACKGROUND

In recent years problems have arisen with the formation of scratches on automobile paint films as a result of car-wash machines and there is a pressing need for the development of paints which have excellent car-wash scratching resistance and durability. In the past softening the paint film itself by reducing the Tg and crosslink density of the paint film and improving the scratching resistance has been considered as a means of resolution which improves the scratching resistance but, although the car-wash scratching resistance is improved, this results in the other features such as hardness, staining resistance, acid resistance and the like which are required of the paint film obtained being lost.

Paint compositions which contain as essential components (A) acrylic copolymers of acid value from 25 to 125 and hydroxyl group value from 30 to 150 which contain (meth) acrylic acid derivative units, (B) acrylic copolymer of epoxy equivalent from 230 to 1500 and hydroxyl group value from 30 to 150 which contain unsaturated monomer units which have epoxy groups, where the (A) and (B) components are copolymers which may contain unsaturated monomers which are ε-caprolactone modifications of acrylic monomers which have hydroxyl groups, and (C) amino resins are known as a method of obtaining paint films which have excellent acid resistance and scratching resistance (for example, see Japanese Unexamined Patent Application Laid Open H5-171103). However, with these paint compositions there is a weakness in that the acid rain resistance is reduced since they have an amino resin as an essential component.

Furthermore, similarly high solid fraction paint compositions which are characterized by the fact that they contain in the proportions indicated (A) from 5 to 30 wt % of hydroxyl group containing lactone modified oligomer of weight average molecular weight not more than 1,000 and of which the hydroxyl group value is from 200 to 800, (B) from 5 to 50 wt % of hydroxyl group containing resin of weight average molecular weight from 1,000 to 6,000 and of which the hydroxyl group value is from 50 to 200, (C) from 30 to 70 wt % of polyisocyanate compound and (D) from 3 to 30 wt % of melamine resin are known as paint compositions in which two types of hydroxyl group containing resin are used and which have excellent finished appearance, paint film hardness, acid rain resistance and scratching resistance, and which have a high solid fraction (for example, see Japanese Unexamined Patent Application Laid Open 2002-105397). However, with these paint compositions the glass transition point (Tg) of the paint film is inevitably reduced by the use of the low molecular weight hydroxyl group containing lactone oligomer and there is a weakness in that the staining resistance and the weather resistance are reduced.

Furthermore, paint compositions which have as essential components (a) from 30 to 90 parts by mass of a lactone modified acrylic polyol resin which has been obtained by the ring-opening addition reaction in the absence of a catalyst on adding from 10 to 200 parts by mass of lactone compound to 100 parts by mass of an acrylic polyol resin of which the hydroxyl group value is from 75 to 250 mgKOH/g and the acid value is from 0.5 to 50 mgKOH/g, (b) from 10 to 70 parts by mass of polyisocyanate compound and (c) from 0.01 to 20 parts by mass of a specified alkoxysilane partially hydrolyzed condensate are known as paint compositions where the staining resistance and impact resistance are excellent and where at the same time the appearance, weather resistance, water resistance and the like are also excellent (for example, see Japanese Unexamined Patent Application Laid Open 2003-313493). However, with these paint compositions there is a weakness in that the balance of the paint film performance in terms of the car-wash scratching resistance and the acid rain resistance, staining resistance and weather resistance cannot be maintained satisfactorily because of the presence of one type of lactone modifier acrylic polyol resin.

SUMMARY

The invention is intended to provide paint compositions with which paint films which have excellent car-wash scratching resistance, acid resistance, staining resistance, water resistance, weather resistance and appearance can be obtained, a method of paint finishing in which these paint compositions are used, and the painted objects.
[Means of Resolving These Problems]

As a result of thorough research carried out with a view to resolving the abovementioned problems, the inventors have discovered that these aims can be achieved by means of a paint composition in which resins which have different hydroxyl group values are combined, and which has as essential components two types of hydroxyl group containing resin in which the amounts of lactone compound modification are different and a crosslinking agent which reacts with hydroxyl groups, and the invention is based upon these findings.

That is to say, the invention provides a paint composition which has as essential components a hydroxyl group containing resin (A) of hydroxyl group value including the hydroxyl groups originating from a 2,2-methylolalcanoic acid from 200 to 400 mgKOH/g and which contains less than 25 mass % in the resin solid fraction of structural units based on a lactone compound, a hydroxyl group containing resin (B) of hydroxyl group value from 50 to 200 mgKOH/g which contains from 25 to 75 mass % in the resin solid fraction of structural units based on a lactone compound, and a crosslinking agent (C) which includes in one molecule at least two functional groups which react with hydroxyl groups, and in which the proportions of the hydroxyl group containing resin (A) and the hydroxyl group containing resin (B) are, as the resin solid fraction mass ratio (A)/(B), from 90/10 to 10/90.

Furthermore, the invention provides a composition in which, in the abovementioned paint composition, at least 40% of the hydroxyl groups of the hydroxyl group containing resin (A) are the hydroxyl groups of a 2,2-dimethylolalkanoic acid and the hydroxyl groups produced by the addition reaction to an epoxy group containing radically polymerizable monomer or polymer of a hydroxyl group of 2,2-dimethyloilalkanoic acid.

Furthermore, the invention provides a paint composition in which, in the abovementioned paint composition, the 2,2-dimethylolalkanoic acid is 2,2-dimethylolbutanoic acid or 2,2-dimethylolpropionic acid.

Furthermore, the invention provides a paint composition in which, in the abovementioned paint composition, the hydroxyl group containing resin (A) and the hydroxyl group containing resin (B) are acrylic resins of weight average molecular weight from 1,000 to 30,000.

Furthermore, the invention provides a paint composition in which, in the abovementioned paint composition, the crosslinking agent (C) is an isocyanate compound and/or a melamine resin.

Furthermore, the invention provides a method of paint finishing in which the abovementioned paint composition is applied as a top-coat paint and, furthermore, the invention provides the painted objects which have been painted with the abovementioned paint finishing method.

The invention provides paint films which have excellent acid resistance, staining resistance, water resistance and weather resistance and which have in particular excellent car-wash scratching resistance. Furthermore, the method of paint finishing in which paint compositions of this invention are used provides paint films which have an excellent appearance, and the painted objects are excellent in terms of the aforementioned paint film performance.

DETAILED DESCRIPTION

Two types of hydroxyl group containing resin, (A) and (B), are used in a paint composition of this invention.

The hydroxyl group containing resin (A) is a resin of which the hydroxyl group value including the hydroxyl groups originating from a 2,2-dimethylolalkanoic acid of from 200 to 400 mgKOH/g and which contains less than 25 mass % in the resin solid fraction of structural units based on a lactone compound. Hydroxyl group containing acryl resins and polyester resins can be cited for the hydroxyl group containing resin (A), but the use of an acrylic resin is preferred.

In this invention the hydroxyl group containing resin (A) provides staining resistance and paint film hardness by providing a paint film which has an adequate crosslink density.

The hydroxyl group value of the hydroxyl group containing resin (A) is from 200 to 400 mgKOH/g, but it is preferably from 200 to 320 mgKOH/g and most desirably from 200 to 280 mgKOH/g. In those cases where the hydroxyl group value is less than 200 mgKOH/g the staining resistance is reduced and paint film hardness is not obtained because the crosslink density of the paint film is inadequate. Furthermore, in those cases where the hydroxyl group value exceeds 400 mgKOH/g the appearance of the paint film is poor because compatibility with the crosslinking agent is not obtained.

Furthermore, the hydroxyl group containing resin (A) is a resin which contains less than 25 mass % in the resin solid fraction of structural units based on a lactone compound, but the content is preferably at least 2 mass % and less than 25 mass % and most desirably at least 5 mass % and less than 25 mass %. If the structural unit based on a lactone compound content of the hydroxyl group containing resin (A) is 25 mass % or more then the hardness and staining resistance of the paint film obtained are reduced.

The hydroxyl group containing resin (B) is a resin which has a hydroxyl group value from 50 to 200 mgKOH/g and which contains from 25 to 75 mass % in the resin solid fraction of structural units based on a lactone compound. The hydroxyl group containing resins (B) include hydroxyl group containing resins such as acrylic resins and polyester resins, but the use of acrylic resins is preferred.

In this invention the hydroxyl group containing resin (B) can improve the car-wash scratching resistance by providing the paint film with elasticity.

The hydroxyl group value of the hydroxyl group containing resin (B) is from 50 to 200 mgKOH/g, but it is preferably from 80 to 190 mgKOH/g, and most desirably from 100 to 180 mgKOH/g. In those cases where the hydroxyl group value is less than 50 mgKOH/g paint film hardness is not obtained and the staining resistance is reduced, and in those cases where the hydroxyl group value exceeds 200 mgKOH/g failure of the paint film appearance occurs because compatibility with the crosslinking agent is not obtained.

The hydroxyl group containing resin (B) is a resin which contains from 25 to 75 mass % in the resin solid fraction of structural units which are based on a lactone compound, but the content is preferably from 25 to 60 mass % and most desirably from 25 to 50 mass %. In those cases where the structural units based on a lactone compound included in the hydroxyl group containing resin (B) account for less than 25 mass % then the car-wash scratching resistance of the paint film obtained is reduced, and if the content exceeds 75 mass % then the compatibility of the paint is reduced and the hardness and staining resistance of the paint film are poor.

Furthermore, the weight average molecular weights of the hydroxyl group containing resins (A) and (B) are preferably from 1,000 to 30,000, more desirably from 2,000 to 20,000, and most desirably from 3,000 to 15,000. In those cases where the weight average molecular weights are less than 1,000 there is a tendency for paint film hardness not to be obtained and appearance failure when wet-on-wet painting tends to occur, and in those cases where the weight average molecular weights exceeds 30,000 appearance failure of the paint film tends to occur as a result of a reduction of the compatibility with the crosslinking agent.

Examples of the lactone compounds which can be used in the invention include β-methyl-δ-valerolactone, γ-valerolactone, δ-valerolactone, δ-caprolactone, γ-caprolactone, ε-caprolactone, β-propiolactone, γ-butyrolactone, γ-nonanoic lactone and δ-dodecalactone, but ε-caprolactone is especially desirable. One of these lactone compounds may be used, or a combination of two or more types may be used.

The abovementioned lactone compounds may be incorporated into the resin by means of a ring-opening addition reaction with the hydroxyl groups of the hydroxyl group containing resin (A) and/or the hydroxyl group containing resin (B), or they may be incorporated into the hydroxyl group containing resin (A) and/or hydroxyl group containing resin (B) by forming a lactone modified hydroxyl group containing radically polymerizable monomer by means of a ring-opening addition reaction with the hydroxyl group of a hydroxyl group containing radically polymerizable monomer beforehand and copolymerizing this lactone modified hydroxyl group containing radically polymerizable monomer.

Furthermore, at least 40%, and more desirably at least 50%, of the hydroxyl groups included in the hydroxyl group containing resin (A) of this invention are preferably hydroxyl groups of (a) a 2,2-dimethylolalcanoic acid and hydroxyl groups produced by an addition reaction on (b) an epoxy group containing radically polymerizable monomer or polymer of a 2,2-dimethylolalkanoic acid.

In those cases where the hydroxyl groups originating from the abovementioned (a) component and the hydroxyl groups originating from the abovementioned (b) component account for less than 40% of the hydroxyl groups included in the hydroxyl group containing resin (A) there is a tendency for the appearance to decline due to compatibility failure of the paint.

Furthermore, 2,2-dimethylolalkanoic acids which include a carboxyl group which has from five to ten carbon atoms, preferably from five to eight carbon atoms, and most desirably five or six carbon atoms, are preferred for the (a) component. Actual examples of the (a) component include 2,2-dimethylolpropionic acid, 2,2-dimethylolbutanoic acid, 2,2-dimethylolpentanoic acid and 2,2-dimethylolhexanoic acid, but 2,2-dimethylolpopionic acid and 2,2-dimethylolbutanoic acid are preferred because they provide resins which have a lower polarity.

As indicated above, hydroxyl groups can be provided in a resin by subjecting the (a) component 2,2-dimethylolalkanoic acid to an addition reaction with a (b) component radically polymerizable monomer or polymer which has epoxy groups, and the addition reaction of the (a) component 2,2-dimethylolalkanoic acid and the (b) component epoxy groups may be carried out before the copolymerization of the (b) component monomer and other radically polymerizable monomer, during the copolymerization or after the copolymerization has been completed.

The amount of the (a) component 2,2-dimethylolalkanoic acid compounded depends on the amount of the (b) component and the hydroxyl group value of the resin, but the (a) component acid is preferably used in an amount within the range of not more than 1.2 times the amount of (b) component epoxy groups as a mol ratio. In those case where there the (a) component acid is in excess of 1.2 times the amount of epoxy groups as a mol ratio the unreacted acid sometimes precipitates out in the resin and this is undesirable. No particular limitation is imposed as a lower limit for the amount of the (a) component 2,2-dimethylolalkanoic acid compounded, but the presence of at least 5 mass % in the resin solid fraction is preferred. In those cases where the carboxyl groups of the (a) component 2,2-dimethylolalkanoic acid is in excess of the (b) component epoxy groups the excess carboxyl groups of the (a) component 2,2-dimethylolalkanoic acid cannot react with (b) component epoxy groups and so the (a) component 2,2-dimethylolalkanoic acid which does not have a polymerizable double bond may be present in an unreacted form in a hydroxyl group containing resin composition for paint purposes of this invention. On the other hand, in those cases where the (b) component epoxy groups are in excess of the carboxyl groups of the (a) component 2,2-dimethylolalkanoic acid the hydroxyl group containing resin obtained may have epoxy groups.

Furthermore, the epoxy group containing radically polymerizable monomer which is one type of (b) component which can be used for obtaining a hydroxyl group containing resin composition for paint purposes of this invention is an epoxy group containing radically polymerizable monomer which has one or more radically polymerizable carbon-carbon double bond, and the number of radically polymerizable carbon-carbon double bonds is preferably not more than two and most desirably one. The (b) component may have functional groups other than the epoxy group but those which do not react with the hydroxyl groups and carboxyl groups of the (a) component are preferred, and those which have no functional group other than the epoxy group are most desirable. Actual examples of the (b) component include glycidyl acrylate, glycidyl methacrylate, 3,4-epoxycyclohexylmethyl acrylate and 3,4-epoxycyclohexylmethyl methacrylate, and one type, or a combination of two or more types, can be used.

The epoxy group containing polymers which are the other type of (b) component are polymers obtained by polymerizing the abovementioned epoxy group containing radically polymerizable monomers.

Moreover, as with the hydroxyl group containing resin (A), a combination of 2,2-dimethylolalkanoic acid and epoxy group containing radically polymerizable monomer or polymer can also be used in the hydroxyl group containing resin (B).

Furthermore, with the hydroxyl group containing resin (A) and the hydroxyl group containing resin (B) hydroxyl groups due to radically polymerizable monomers which have hydroxyl groups can also be used for the hydroxyl groups other than the hydroxyl groups of 2,2-dimethylolalkanoic acid and the hydroxyl groups produced by an addition reaction on epoxy group containing radically polymerizable monomer or polymer of 2,2-dimethylolalkanoic acid.

Examples of these radically polymerizable monomers which have hydroxyl groups include 2-hydroxyethyl (meth)acrylate, 2-hydroxypropyl (meth)acrylate, 3-hydroxypropyl (meth)acrylate, 4-hydroxybutyl (meth)-acrylate, allyl alcohol; versatic acid glycidyl ester adducts of (meth)acrylic acid; ε-caprolactone adducts of 2-hydroxyethyl (meth)acrylate, 2-hydroxypropyl (meth)acrylate, 3-hydroxypropyl(meth) acrylate and 4-hydroxybutyl (meth)acrylate; and ethylene oxide and/or propylene oxide adducts of 2-hydroxyethyl (meth)-acrylate, 2-hydroxypropyl (meth)acrylate, 3-hydroxy-propyl(meth)acrylate and 4-hydroxybutyl (meth)acrylate.

Other radically polymerizable monomers can be used and copolymerized in the hydroxyl group containing resin (A) and the hydroxyl group containing resin (B) and actual examples of these radically polymerizable monomers include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide and methacrylamide, and one type, or a combination of two or more types, can be used.

A radical polymerization initiator may be compounded when carrying out the radical polymerization. Examples of the radical polymerization initiators include azo compounds such as 2,2'-azobis-isobutyronitrile, 2,2'-azobis-2,4-dimethylvaleronitrile, 4,4'-azobis-4-cyanovaleric acid, 1-azobis-1-cyclohexanecarbonitrile and dimethyl-2,2'-azobisisobutyrate; and organic peroxides such as methyl ethyl ketone peroxide, cyclohexanone peroxide, 3,5,5-trimethylhexanone peroxide, 1,1-bis(t-butylperoxy)-3,3,5-trimethylcyclohexane, 1,1-bis(t-butylperoxy)cyclohexane, 2,2-bis(t-butylperoxy)octane, t-butyl hydroperoxide, diisopropylbenzene hydroperoxide, dicumyl peroxide, t-butylcumyl peroxide, isobutyl peroxide, lauroyl peroxide, benzoyl peroxide, diisopropyl peroxydicarbonate, t-butylperoxy 2-ethylhexanoate, t-butylperoxy neodecanate, t-butylperoxy laurate, t-butylperoxy benzoate and t-butylperoxy isopropyl carbonate. One of these radical polymerization initiators may be used alone, or a combination of two or more types may be used.

No particular limitation is imposed upon the amount of radical polymerization initiator compounded, but an amount of from 0.01 to 20 mass % with respect to the total amount of radically polymerizable monomer is preferred.

Reducing agents such as dimethylaniline, ferrous salts such as ferrous sulfate, ferrous chloride and ferrous acetate, acidic sodium sulfite, sodium thiosulfate and rongalite may be combined, as required, with these radical polymerization initiator systems, but care is require with the selection so that the polymerization temperature is not too low.

Moreover, one type, or a combination of a plurality of types, of known reaction catalysts such as Lewis acids, tertiary amines, ammonium salts, phosphonium salts and the like can be used, as required, with a view to promoting the reaction between the carboxyl groups of the (a) component and the epoxy groups of the (b) component.

The organic solvents which can be used in the production of the hydroxyl group containing resins (A) and the hydroxyl group containing resins (B) of this invention are preferably solvents which do not have functional groups which react with the carboxyl groups of the (a) component, the epoxy groups of the (b) component or lactone compounds.

Examples of suitable organic solvents which can be used in the production of the hydroxyl group containing resins (A) and the hydroxyl group containing resins (B) of this invention include alicyclic hydrocarbon solvents such as cyclohexane and ethylcyclohexane, aromatic hydrocarbon solvents such as toluene, xylene, ethylbenzene and aromatic naphtha, ketone solvents such as acetone, methyl ethyl ketone, methyl isobutyl ketone, cyclohexanone and isophorone, ester-based solvents such as ethyl acetate, n-butyl acetate, isobutyl acetate, 3-methoxybutyl acetate and bis(2-ethylhexyl)adipate, ether based solvent such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. The organic solvent may be of one type alone or it may be a mixed solvent comprising a plurality of two or more types. At this time the solid fraction concentration of the hydroxyl group containing resin can be selected optionally within the range where the dispersion stability of the resin is not lost, but generally the solid fraction concentration is from 10 to 70 mass %.

The method of adding the organic solvent and radical polymerization initiator is optional when producing the hydroxyl group containing resins (A) and hydroxyl group containing resins (B) of this invention, but methods in which the radically polymerizable monomer which includes the (b) component is added dropwise from a drip feed vessel while stirring the (a) component or an organic solvent solution thereof which has been introduced into a reaction vessel, or a method in which the (a) component or an organic solvent solution thereof and the radically polymerizable monomer which includes the (b) component, or an organic solvent solution thereof, are both added dropwise from drip feed vessels are preferred with a view to controlling the heat of polymerization and the heat of reaction. Moreover, the radically polymerizable monomer which includes the (b) component may be just the (b) component radically polymerizable monomer which has epoxy groups or it may be a combination of the (b) component radically polymerizable monomer which has epoxy groups and other radically polymerizable monomer.

The polymerization temperature of the abovementioned reactions differs according to the type of radical polymerization initiator and whether or not a reducing agent is used conjointly and whether or not a reaction catalyst for the carboxyl groups and epoxy groups is present, but the polymerizations are preferably carried out under conditions of from 50 to 200° C., and more desirably under conditions of from 80 to 160° C. In those cases where the polymerization temperature is below 50° C. the reaction of the (a) component carboxyl groups and (b) component epoxy groups does not proceed satisfactorily and phase separation of the radically polymerizable monomer and the hydroxyl group containing resin is liable to occur. On the other hand, in those cases where it exceeds 200° C. side reactions such as unexpected depolymerization occur.

The mixing proportions as the mass ratio of the resin solid fractions used of the hydroxyl group containing resin (A) and the hydroxyl group containing resin (B) in a paint composition in this invention are preferably within the range from 90/10 to 10/90, and most desirably within the range from 80/20 to 40/60. With less than 10 mass % with respect to the total amount of hydroxyl group containing resin (A) and hydroxyl group containing resin (B) of the hydroxyl group containing resin (B) the car-wash scratching resistance of the paint film obtained is reduced, and in those cases where it exceeds 90 mass % the staining resistance and acid rain resistance are reduced.

The crosslinking agents (C) which can be used in the paint compositions of this invention are crosslinking agents which have in one molecule at least two, and preferably at least three, functional groups which react with hydroxyl groups, and examples include isocyanate compounds which have in one molecule at least two, and preferably three or more, functional groups such as isocyanate groups or blocked isocyanate groups, and melamine resins. One type of crosslinking agent may be used alone, or a combination of two or more types may be used.

Examples of polyisocyanate compounds which have two or more isocyanate groups in one molecule include p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylenebis (phenylisocyanate), lysine methyl ester diisocyanate, bis (isocyanatoethyl) fumarate, isophorone diisocyanate, methylcyclohexyl diisocyanate, 2-isocyanatoethyl-2,6-diisocyanatohexanoate and the biuret and isocyanurate forms of these.

The isocyanate compounds where a polyisocyanate compound which has two or more isocyanate groups in one molecule, for example a polyisocyanate such as hexamethylene diisocyanate, phenylene diisocyanate, xylylene diisocyanate or isophorone diisocyanate, has been blocked with a blocking agent such as an active methylene system, for example methyl acetoacetate or dimethyl malonate, or an oxime can be cited as isocyanate compounds which have blocked isocyanate groups.

The alkyl etherified melamine resins are preferred for the melamine resins, and these include the methylolated amino resins obtained by reacting melamine and aldehydes. Examples of the aldehydes include formaldehyde, paraformaldehyde, acetaldehyde and benzaldehyde. Furthermore, those where a methylated amino resin has been etherified with one type, or two or more types, of lower alcohol can also be used, and the monohydric alcohols such as methyl alcohol, ethyl alcohol, n-propyl alcohol, isopropyl alcohol, n-butyl alcohol, isobutyl alcohol 2-ethylbutanol and 2-ethyl-hexanol can be cited as examples of the alcohols which can be used for the etherification. From among these the methylolated melamine resins and the melamine resins where at least some of the methylol groups of a methylolated melamine resin have been etherified with a primary alcohol which has from 1 to 4 carbon atoms are ideal.

Commercial examples of the abovementioned melamine resins include butyl etherified melamine resins such as Yuban 20SE-60 and Yuban 225 (trade names, both produced by the Mitsui Kagaku Co.) and Superbekkamine G840 and Superbekkamine G821 (trade names, both produced by the Dainippon Ink Kagaku Co.), and methyl etherified melamine resins such as Sumimar M-100, Sumimar M-40S and Sumimar M-55 (trade names, all produced by the Sumitomo Kagaku Co.) and Saimel 303, Saimel 325, Saimel 350 and Saimel 370 (trade names, all produced by the Nippon Scitech Industries Co.).

In those cases where isocyanate compounds and melamine resins are used conjointly as crosslinking agents they are preferably used in a solid fraction mass ratio of from 100/0 to 75/25, and most desirably of from 100/0 to 85/15. In those cases where the mixing proportion of melamine resin exceeds 25 mass % the car-wash scratching resistance and acid resistance of the paint film obtained are reduced.

The mixing ratio of the hydroxyl group containing resin (A) and the hydroxyl group containing resin (B) with the crosslinking agent (C) is preferably such that, as a resin solid fraction mass ratio, when the total of (A) and (B) is 100, from 10 to 190, and more desirably from 15 to 120, of (C) are used. In those cases where the proportion by mass of crosslinking agent is less than 10 per 100 of hydroxyl group containing resin the staining resistance is reduced and a paint film with adequate hardness is not obtained. Furthermore, in those cases where the proportion exceeds 190 the paint film becomes brittle and a reduction in weather resistance occurs.

The paint compositions of this invention can be used as they are or with the addition, as required, of organic solvents and various additives, such as ultraviolet absorbers, photo-stabilizers, antioxidants, surfactants, surface controlling agents, hardening reaction catalysts, anti-static agents, perfumes, water removing agents and rheology-controlling agents such as polyethylene wax, polyamide wax and fine internally crosslinked resin particles for example.

The paint compositions of this invention may be used as clear paints, or coloring agents such as dyes, pigments and the like may compounded and they may be used as colored paints.

The paint compositions of this invention are preferably used as top-coat paint compositions.

The paint finishing method for a top-coat paint composition of this invention is, for example, a two-coat one-bake paint finishing method in which a colored base-coat is painted on the base material and the paint composition of this invention is painted on as a top coat without crosslinking or an over-coat paint finishing method where a colored base-coat is painted on the base material and a top-coat paint is painted on without crosslinking and, after baking both at the same time, a paint composition of this invention is painted on as an over-coat paint and baked, and there are also methods where in the aforementioned over-coating method a primer paint is painted on to ensure adhesion with the underlying coat and the paint composition of this invention is painted on as an over-coat clear paint without crosslinking.

The aforementioned colored base coat paint, top-coat paint, over-coating paint or primer paint is adjusted to the prescribed viscosity by heating or adding an organic solvent or reactive diluent, as required, and the painting is carried out using a painting machine of the type generally used such as an air sprayer, electrostatic air sprayer, roll coater, flow coater or a painting machines with dipping system for example, or using a brush or a bar coater or an applicator, for example. From among these methods spray painting is preferred.

The amount of a paint composition of this invention which is applied is preferably such that the dry film thickness is generally from 10 to 100 µm. In general a paint film which is obtained by painting with a paint composition of this invention is preferably baked.

Furthermore, the baking temperature should generally be selected appropriately within the range from 120 to 180° C. Moreover, the baking time should generally be selected appropriately within the range from 10 to 60 minutes.

Furthermore, examples of the base material on which a paint composition of this invention is painted include organic materials and inorganic materials such as wood, glass, metal, cloth, plastics, foams, elastomers, paper, ceramics, concrete and plasterboard. These base materials may be materials which have been surface treated beforehand or they may be materials on which a paint film has been formed on the surface beforehand.

Actual examples have been indicated so far, but the method of paint finishing with a paint composition of this invention is not limited to just these methods.

Examples of painted objects which can be obtained with a clear composition of this invention include structures, wooden products, metal products, plastic products, rubber products, processed paper, ceramic products and glass products. In more practical terms these include automobiles, automobile parts (for example bodies, bumpers, spoilers, mirrors, wheels, internal decorative parts and those made of various materials), metal sheets such as steel sheet, bicycles, bicycle parts, street furnishings (for example, guard rails, traffic signs and sound-deadening walls), tunnel furnishings (for example side-wall sheets), ships, railway rolling stock, aircraft, furniture, musical instruments, domestic electrical goods, building materials, containers, office equipment, sports goods, toys and the like.

EXAMPLES

The invention is described in more practical terms below by means of illustrative examples, but the invention is in no way limited by these illustrative examples. Moreover, the performance of the paint films obtained with the clear paint compositions of this invention was determined in each case in the ways indicated below.

(1) Appearance

The appearance was evaluated by visual observation of the paint film in accordance with the following criteria.

O: When a fluorescent lamp was reflected in the paint film the fluorescent lamp was reflected distinctly.

Δ: When a fluorescent lamp was reflected in the paint film the outline (profile) of the fluorescent lamp was slightly blurred.

X: When a fluorescent lamp was reflected in the paint film the outline (profile) of the fluorescent lamp was markedly blurred.

(2) Hardness

This was evaluated by touching with a finger on the basis of the following criteria.

O: The paint film did not feel tacky

Δ: The paint film felt slightly tacky

X: The paint film felt distinctly tacky (3) Car-Wash Scratching Resistance

Dirty water (JIS Z-8901-84, a 10/99/1 mixture of type 8 dust/water/neutral detergent) was applied with a brush to a test sheet on the surface of which a paint film had been formed and then it was cleaned with a car-wash brush rotating at 150 rpm for 10 seconds in an automatic car-wash machine and the test sheet was rinsed with flowing water. This procedure was repeated ten times and then the extent of scratching of the test sheet surface was determined by measuring the L* value with a color difference meter (CR-331, produced by the Minolta Camera Co.). A low numerical value is good.

(4) Acid Resistance

A 40% sulfuric acid aqueous solution (0.2 ml) was placed as a spot on the test sheet and then heated to 60° C. for 15 minutes and then rinsed with water and then the extent to which a mark had been produced was assessed visually.
O: Virtually no change to be seen in the paint film
Δ: A slight water mark was seen
X: A pronounced water mark was seen (5) Staining Resistance Dirty water (JIS Z-8901-84, a 1.3/98/0.5/0.2 by mass mixture of type 8 dust/water/carbon black/yellow ochre) was coated onto a test sheet on the surface of which a paint film had been formed and then dried for 10 minutes at 50° C. and, after carrying out eight cycles, the paint film was cleaned with a fixed force with a polishing cloth while rinsing with water and the staining mark was assessed visually and evaluated in accordance with the following criteria.
O: No staining
Δ: Staining material remained in parts
X: Staining material remained all over (6) Water Resistance After a test sheet on the surface of which a paint film had been formed had been exposed outdoors for 3 months in accordance with JIS K-5500 (1990) 9.9 Weather Resistance, the color of the unwashed surface of the paint film was measured on the basis of the JIS K-5400 (1990) 7.4.2 Color Meter Measuring Method for Paint Films, the ΔL* value was calculated by subtracting the L* value before the test from the L* value after immersion in warm water at 40° C. for 240 hours and the whitening of the paint film was assessed. A small numerical value is good.

(7) Weather Resistance

The state of the paint film was assessed visually after exposing a test sheet on the surface of which a paint film had been formed for 3000 hours using a sunshine carbon arc lamp type accelerated weather resistance testing machine (JIS K-5400 (1990) 9.8.1).

Examples of Production 1 to 6

Production of Hydroxyl Group Containing Solutions for Paint Purposes A-1 to A-6

The xylene and 2,2-dimethylolbutanoic acid of the composition shown in Table 1 was introduced into a four-necked flask which had been furnished with a thermometer, a reflux condenser, a stirrer and a dropping funnel and heated while being stirred under a current of nitrogen and maintained at 140° C. Next, the mixture of monomer and polymerization initiator of the composition shown in Table 1 (the drip-feed component) was drip fed from the dropping funnel at a uniform rate over a period of 2 hours at a temperature of 140° C. After the drip-feed had been completed the temperature of 140° C. was maintained for 1 hour and then the reaction temperature was lowered to 110° C. Subsequently, a polymerization initiator solution of the composition shown in Table 1 (the supplementary catalyst) was added and, after maintaining a temperature of 110° C. for 2 hours, the amount of ε-caprolactam indicated in Table 1 was introduced and the reaction was completed on maintaining a temperature of 150° C. for 3 hours and the hydroxyl group containing resin solution for paint purposes A-1 was obtained. Furthermore, the hydroxyl group containing resin solutions for paint purposes A-2 to A-6 were obtained in the same way as the hydroxyl group containing resin for paint purposes A-1 except that the amounts of the raw materials introduced shown in Table 1 were changed.

TABLE 1

| | | Example of Production 1 | Example of Production 2 | Example of Production 3 | Example of Production 4 | Example of Production 5 | Example of Production 6 |
|---|---|---|---|---|---|---|---|
| Hydroxyl group containing resin for paint purposes | | A-1 | A-2 | A-3 | A-4 | A-5 | A-6 |
| Initial Introduction | Xylene | 32.9 | 32.9 | 32.9 | 32.9 | 32.9 | 32.9 |
| | 2-2-Dimethylolbutanoic acid (DMBA) | 6.6 | 7.8 | 9.2 | 3.6 | 4.8 | 12.5 |
| Drip-feed Component | 2-Ethylhexyl methacrylate (EHMA) | 17.3 | 5.1 | 17.0 | 34.8 | 0.5 | 12.6 |
| | 2-Hydroxyethyl acrylate (HEA) | | | | | 40.8 | |
| | 2-Hydroxyethyl methacrylate ((HEMA) | 17.4 | 26.7 | 11.5 | 11.4 | | 1.9 |
| | Glycidyl methacrylate | 7.9 | 8.4 | 7.9 | 4.2 | 4.9 | 13.2 |
| | t-Butylperoxy-2-ethylhexanoate | 5.0 | 5.0 | 5.0 | 5.0 | 5.0 | 5.0 |
| Catalyst Component | t-Butylperoxy-2-ethylhexanoate | 0.1 | 0.1 | 0.1 | 0.1 | 0.1 | 0.1 |
| | Xylene | 1.0 | 1.0 | 1.0 | 1.0 | 1.0 | 1.0 |
| Supplementary Component | ε-Caprolactam | 10.8 | 12.0 | 14.4 | 6.0 | 9.0 | 19.8 |
| | Xylene | 1.0 | 1.0 | 1.0 | 1.0 | 1.0 | 1.0 |
| Total | | 100.0 | 100.0 | 100.0 | 100.0 | 100.0 | 100.0 |
| Resin hydroxyl group value (mgKOH/g) | | 250 | 340 | 260 | 150 | 420 | 250 |
| Involatile fraction (%) | | 65.1 | 65.1 | 65.1 | 65.1 | 65.1 | 65.1 |
| Weight average molecular weight | | 5000 | 5000 | 5000 | 5000 | 5000 | 5000 |
| Amount of lactone compound in the resin solid fraction (mass %) | | 16.6 | 18.4 | 24.0 | 10.0 | 15.0 | 33.0 |
| Proportion of hydroxyl groups originating from dimethylolalkanoic acid among the hydroxyl groups (mass %) | | 50.0 | 43.5 | 66.8 | 45.3 | 21.7 | 94.4 |

Examples of Production 7 to 13

Production of Hydroxyl Group Containing Solutions for Paint Purposes B-1 to B-7

The hydroxyl group containing resin solutions B-1 to B-7 where obtained in the same way as the hydroxyl group containing resin solution A-1 except that the amounts of the raw materials shown in Table 2 introduced were changed.

TABLE 2

|  |  | Example of Production 7 | Example of Production 8 | Example of Production 9 | Example of Production 10 | Example of Production 11 | Example of Production 12 | Example of Production 13 |
| --- | --- | --- | --- | --- | --- | --- | --- | --- |
| Hydroxyl group containing resin for paint purposes |  | B-1 | B-2 | B-3 | B-4 | B-5 | B-6 | B-7 |
| Initial Introduction | Xylene | 32.9 | 32.9 | 32.9 | 32.9 | 32.9 | 32.9 | 32.5 |
| Drip-feed Component | 2-Ethylhexyl methacrylate | 11.0 | 5.0 | 9.8 | 30.4 | 1.2 | 25.5 |  |
|  | Butyl acrylate | 3.6 | 3.6 |  |  |  |  |  |
|  | 2-Hydroxyethyl acrylate |  |  |  |  |  |  | 7.4 |
|  | 2-Hydroxyethyl methacrylate | 15.8 | 8.5 | 13.8 | 5.6 | 5.3 | 5.3 |  |
|  | 2-Hydroxypropyl methacrylate | 5.5 | 2.9 | 12.5 |  | 29.5 | 17.2 |  |
|  | t-Butylperoxy-2-ethylhexanoate | 5.0 | 5.0 | 5.0 | 5.0 | 5.0 | 5.0 | 5.0 |
| Supplementary Catalyst | t-Butylperoxy-2-ethylhexanoate | 0.1 | 0.1 | 0.1 | 0.1 | 0.1 | 0.1 | 0.1 |
|  | Xylene | 1.0 | 1.0 | 1.0 | 1.0 | 1.0 | 1.0 | 1.0 |
| Supplementary Component | ε-Caprolactone | 24.0 | 40.0 | 24.0 | 24.0 | 24.0 | 12.0 | 53.0 |
|  | Xylene | 1.0 | 1.0 | 1.0 | 1.0 | 1.0 | 1.0 | 1.0 |
| Total |  | 100.0 | 100.0 | 100.0 | 100.0 | 100.0 | 100.0 | 100.0 |
| Resin hydroxyl group value (mgKOH/g) |  | 150 | 80 | 180 | 40 | 230 | 150 | 60 |
| Involatile fraction (%) |  | 65.1 | 65.1 | 65.1 | 65.1 | 65.1 | 65.1 | 65.5 |
| Weight average molecular weight |  | 5200 | 5200 | 5200 | 5200 | 5200 | 5200 | 5200 |
| Lactone compound structural unit content in resin solid fraction (mass %) |  | 36.9 | 61.4 | 36.9 | 36.9 | 36.9 | 18.4 | 80.9 |

Examples of Production 14 to 32

Production of Clear Paints CC-1 to CC-19

The raw materials shown in Tables 3 and 4 were mixed sequentially and stirred until uniform mixtures were obtained to prepare clear paints.

TABLE 3

|  | Ex. of Prod. 14 CC-1 | Ex. of Prod. 15 CC-2 | Ex. of Prod. 16 CC-3 | Ex. of Prod. 17 CC-4 | Ex. of Prod. 18 CC-5 | Ex. of Prod. 19 CC-6 | Ex. of Prod. 20 CC-7 |
| --- | --- | --- | --- | --- | --- | --- | --- |
| A-1 | 60 | 60 | 80 | 20 | 60 |  |  |
| A-2 |  |  |  |  |  | 60 |  |
| A-3 |  |  |  |  |  |  | 60 |
| A-4 |  |  |  |  |  |  |  |
| A-5 |  |  |  |  |  |  |  |
| A-6 |  |  |  |  |  |  |  |
| B-1 | 40 | 40 | 20 | 80 |  |  |  |
| B-2 |  |  |  |  |  | 40 |  |
| B-3 |  |  |  |  | 40 |  | 40 |
| B-4 |  |  |  |  |  |  |  |
| B-5 |  |  |  |  |  |  |  |
| B-6 |  |  |  |  |  |  |  |
| B-7 |  |  |  |  |  |  |  |
| Crosslinking agent Desmodure N3200 | 41 | 34.9 | 41 | 41 | 43.4 | 46.1 | 44.5 |
| Crosslinking agent Yuban SE-60 |  | 15 |  |  |  |  |  |

TABLE 3-continued

|  | Ex. of Prod. 14 CC-1 | Ex. of Prod. 15 CC-2 | Ex. of Prod. 16 CC-3 | Ex. of Prod. 17 CC-4 | Ex. of Prod. 18 CC-5 | Ex. of Prod. 19 CC-6 | Ex. of Prod. 20 CC-7 |
|---|---|---|---|---|---|---|---|
| Ultraviolet absorber solution | 7 | 7 | 7 | 7 | 7 | 7 | 7 |
| Photo-stabilizer solution | 7 | 7 | 7 | 7 | 7 | 7 | 7 |
| Surface controlling agent solution | 2 | 2 | 2 | 2 | 2 | 2 | 2 |
| Sorbesso 100 | 15 | 15 | 15 | 15 | 15 | 15 | 15 |
| TOTAL | 172 | 180.9 | 172 | 172 | 174.4 | 177.1 | 175.5 |
| Total hydroxyl group value | 210 | 210 | 210 | 210 | 222 | 236 | 228 |
| Resin A | A-1 | A-1 | A-1 | A-1 | A-1 | A-2 | A-3 |
| Resin B | B-1 | B-1 | B-1 | B-1 | B-3 | B-2 | B-3 |
| Resin A/Resin B mass ratio | 60/40 | 60/40 | 80/20 | 20/80 | 60/40 | 60/40 | 60/40 |
| Isocyanate compound/melamine resin mass ratio | 100/0 | 80/20 | 100/0 | 100/0 | 100/0 | 100/0 | 100/0 |
| Hydroxyl group value of resin A | 250 | 250 | 250 | 250 | 250 | 340 | 260 |
| Hydroxyl group value of resin B | 150 | 150 | 150 | 150 | 180 | 80 | 180 |
| Amount of caprolactone structural units in resin A (mass %) | 16.6 | 16.6 | 16.6 | 16.6 | 16.6 | 18.4 | 24.0 |
| Amount of caprolactone structural units in resin B (mass %) | 36.9 | 36.9 | 36.9 | 36.9 | 36.9 | 61.4 | 36.9 |

TABLE 4

|  | Ex. of Prod. 21 CC-8 | Ex. of Prod. 22 CC-9 | Ex. of Prod. 23 CC-10 | Ex. of Prod. 24 CC-11 | Ex. of Prod. 25 CC-12 | Ex. of Prod. 26 CC-13 | Ex. of Prod. 27 CC-14 | Ex. of Prod. 28 CC-15 | Ex. of Prod. 29 CC-16 | Ex. of Prod. 30 CC-17 | Ex. of Prod. 31 CC-18 | Ex. of Prod. 32 CC-19 |
|---|---|---|---|---|---|---|---|---|---|---|---|---|
| A-1 | 100 |  | 60 | 60 | 60 | 60 | 60 |  |  |  |  |  |
| A-2 |  |  |  |  |  |  |  | 60 |  |  |  |  |
| A-3 |  |  |  |  |  |  |  |  | 60 |  |  |  |
| A-4 |  |  |  |  |  |  |  |  |  | 60 |  |  |
| A-5 |  |  |  |  |  |  |  |  |  |  |  | 60 |
| A-6 |  |  |  |  |  |  |  |  |  |  | 60 |  |
| B-1 |  | 100 | 40 |  |  |  |  |  |  |  | 40 | 40 |
| B-2 |  |  |  |  |  |  |  |  |  |  |  |  |
| B-3 |  |  |  |  |  |  |  |  |  | 40 |  |  |
| B-4 |  |  |  | 40 |  |  |  |  |  |  |  |  |
| B-5 |  |  |  |  | 40 |  |  | 40 |  |  |  |  |
| B-6 |  |  |  |  |  | 40 |  |  |  |  |  |  |
| B-7 |  |  |  |  |  |  | 40 |  | 40 |  |  |  |
| Crosslinking agent Desmodure N3200 | 41 | 41 | 24.6 | 32.4 | 47.3 | 41 | 41 | 57.8 | 35.2 | 34 | 31.6 | 98.7 |
| Crosslinking agent Yuban SE-60 |  |  | 27.3 |  |  |  |  |  |  |  |  |  |
| Ultraviolet absorber solution | 7 | 7 | 7 | 7 | 7 | 7 | 7 | 7 | 7 | 7 | 7 | 7 |
| Photo-stabilizer solution | 7 | 7 | 7 | 7 | 7 | 7 | 7 | 7 | 7 | 7 | 7 | 7 |
| Surface controlling agent solution | 2 | 2 | 2 | 2 | 2 | 2 | 2 | 2 | 2 | 2 | 2 | 2 |
| Sorbesso 100 | 15 | 15 | 15 | 15 | 15 | 15 | 15 | 15 | 15 | 15 | 15 | 15 |
| TOTAL | 172 | 172 | 182.9 | 163.4 | 178.3 | 172 | 172 | 188.8 | 166.2 | 165 | 162.6 | 229.7 |
| Total hydroxyl group value | 210 | 210 | 210 | 166 | 242 | 210 | 174 | 296 | 180 | 162 | 210 | 312 |
| Resin A | A-1 | — | A-1 | A-1 | A-1 | A-1 | A-1 | A-2 | A-3 | A-4 | A-6 | A-5 |
| Resin B | — | B-1 | B-1 | B-4 | B-5 | B-6 | B-7 | B-5 | B-7 | B-3 | B-1 | B-1 |
| Resin A/Resin B mass ratio | 100/0 | 0/100 | 60/40 | 60/40 | 60/40 | 60/40 | 60/40 | 60/40 | 60/40 | 60/40 | 60/40 | 60/40 |
| Isocyanate compound/melamine resin mass ratio | 100/0 | 100/0 | 60/40 | 100/0 | 100/0 | 100/0 | 100/0 | 100/0 | 100/0 | 100/0 | 100/0 | 100/0 |

TABLE 4-continued

|  | Ex. of Prod. 21 CC-8 | Ex. of Prod. 22 CC-9 | Ex. of Prod. 23 CC-10 | Ex. of Prod. 24 CC-11 | Ex. of Prod. 25 CC-12 | Ex. of Prod. 26 CC-13 | Ex. of Prod. 27 CC-14 | Ex. of Prod. 28 CC-15 | Ex. of Prod. 29 CC-16 | Ex. of Prod. 30 CC-17 | Ex. of Prod. 31 CC-18 | Ex. of Prod. 32 CC-19 |
|---|---|---|---|---|---|---|---|---|---|---|---|---|
| Hydroxyl group value of resin A | 250 | — | 250 | 250 | 250 | 250 | 250 | 340 | 260 | 150 | 250 | 420 |
| Hydroxyl group value of resin B | — | 150 | 150 | 40 | 230 | 150 | 60 | 230 | 60 | 180 | 150 | 150 |
| Amount of caprolactone structural units in resin A (mass %) | 16.6 | — | 16.6 | 16.6 | 16.6 | 16.6 | 16.6 | 18.4 | 24 | 10 | 33 | 15 |
| Amount of caprolactone structural units in resin B (mass %) | — | 36.9 | 36.9 | 36.9 | 36.9 | 18.4 | 80.9 | 36.9 | 80.9 | 36.9 | 36.9 | 36.9 |

<< Notes for the Tables >>
1) Desmodure N3200: Trade name, biuret type resin of liquid HDI (involatile fraction 100 mass %, NCO content 23 mass %), produced by the Sumica Beyer Urethane Co.
2) Yuban 20ES-60: Trade name, melamine resin solution (involatile fraction 60 mass %), produced by the Mitsui Kagaku Co.
3) Ultraviolet Absorber Solution: Trade name Tinuvin 900, a 20 mass % xylene solution, produced by the Ciba Specialty Chemicals Co.
4) Photo-stabilizer Solution: Trade name Tinuvin 292, a 20 mass % xylene solution, produced by the Ciba Specialty Chemicals Co.
5) Surface Controlling Agent Solution: Trade name BYK-300, a 10 mass % xylene solution, produced by the Bikkukemi Co.
6) Sorbesso 100: Trade name, aromatic petroleum naphtha, produced by the Esso Co.

Examples 1 to 7

Production of Test Specimens and Investigation of Paint Film Performance

The cationic electro-deposition paint Aqua No. 4200 (trade name, produced by the BASF Coatings Japan Co.) was electro-deposition painted so as to provide a dry film thickness of 20 μm on a zinc phosphate treated mild steel sheet and baked for 25 minutes at 175° C. and then the mid-coat paint HS-H300 (trade name, produced by the BASF Coatings Japan Co.) was air-spray painted so as to provide a dry film thickness of 30 μm and baked for 30 minutes at 140° C. Then Belcoat No. 6000 Black (trade name, produced by the BASF coatings Japan Co., paint color: black) which is a solvent-based base-coat paint was air-spray painted in such a way as to provide a dry film thickness of 15 μm and, after setting for 3 minutes at 20° C., the clear paints CC-1 to CC-7 diluted with Sorbesso 100 (trade name, produced by the Esso Co., aromatic petroleum naphtha) to the painting viscosity (Ford cup No. 4, 25 seconds at 20° C.) were each air-spray painted with a wet-on-wet system in such a way as to provide a dry film thickness of 40 μm and baked at 140° C. for 30 minutes to produce test specimens.

However, in the case of all of Examples 1 to 7, for the staining resistance test sheets only, the base-coat paint was replaced by Belcoat No. 6000 White (trade name, produced by the BASF coatings Japan Co., paint color: white).

The paint film performance test results are shown in Table 5 and in all cases no paint turbidity arose and paint films with a uniform gloss were obtained, and they exhibited excellent appearance, car-wash scratching resistance, acid resistance, staining resistance, water resistance and weather resistance.

TABLE 5

|  | Example 1 CC-1 | Example 2 CC-2 | Example 3 CC-3 | Example 4 CC-4 | Example 5 CC-5 | Example 6 CC-6 | Example 7 CC-7 |
|---|---|---|---|---|---|---|---|
| Appearance | ○ | ○ | ○ | ○ | ○ | ○ | ○ |
| Hardness | ○ | ○ | ○ | ○ | ○ | ○ | ○ |
| Car-wash Damage Resistance | 4.6 | 5.3 | 5.0 | 4.3 | 4.8 | 5.8 | 3.9 |
| Acid Resistance | ○ | ○ | ○ | ○ | ○ | ○ | ○ |
| Staining Resistance | ○ | ○ | ○ | ○ | ○ | ○ | ○ |
| Water Resistance | 0.2 | 0.3 | 0.4 | 0.3 | 0.3 | 0.2 | 0.5 |
| Weather Resistance | No Abnormality | No Abnormality | No Abnormality | No Abnormality | No Abnormality | No Abnormality | No Abnormality |
| Resin A | A-1 | A-1 | A-1 | A-1 | A-1 | A-2 | A-3 |
| Resin B | B-1 | B-1 | B-1 | B-1 | B-3 | B-2 | B-3 |
| Resin A/B Mass Ratio | 60/40 | 60/40 | 80/20 | 20/80 | 60/40 | 60/40 | 60/40 |
| Isocyanate compound/melamine resin mass ratio | 100/0 | 80/20 | 100/0 | 100/0 | 100/0 | 100/0 | 100/0 |
| Hydroxyl group value of resin A | 250 | 250 | 250 | 250 | 250 | 340 | 260 |
| Hydroxyl group value of resin B | 150 | 150 | 150 | 150 | 180 | 80 | 180 |
| Amount of caprolactone structural units in resin A (mass %) | 16.6 | 16.6 | 16.6 | 16.6 | 16.6 | 18.4 | 24 |
| Amount of caprolactone structural units in resin B (mass %) | 36.9 | 36.9 | 36.9 | 36.9 | 36.9 | 61.4 | 36.9 |

Comparative Examples 1 to 12

Production of Test Specimens and Investigation of Paint Film Performance

Test specimens were prepared in the same way as in Example 1 except that the clear paints CC-8 to CC-19 were used. The paint film performance test results are shown in Tables 6 and 7.

TABLE 6

|  | Comparative Example 1 CC-8 | Comparative Example 2 CC-9 | Comparative Example 3 CC-10 | Comparative Example 4 CC-11 | Comparative Example 5 CC-12 | Comparative Example 6 CC-13 |
|---|---|---|---|---|---|---|
| Appearance | ○ | ○ | ○ | ○ | Δ | ○ |
| Hardness | ○ | Δ | ○ | ○ | ○ | ○ |
| Car-wash Damage Resistance | 16.4 | 14.8 | 22.3 | 15.8 | 18.7 | 20.1 |
| Acid Resistance | ○ | Δ | X | ○ | ○ | ○ |
| Staining Resistance | ○ | Δ | ○ | Δ | ○ | ○ |
| Water Resistance | 0.3 | 1.2 | 0.3 | 0.7 | 0.2 | 0.3 |
| Weather Resistance | No Abnormality | No Abnormality | No Abnormality | No Abnormality | No Abnormality | No Abnormality |
| Resin A | A-1 | — | A-1 | A-1 | A-1 | A-1 |
| Resin B | — | B-1 | B-1 | B-4 | B-5 | B-6 |
| Resin A/B Mass Ratio | 100/0 | 0/100 | 60/40 | 60/40 | 60/40 | 60/40 |
| Isocyanate compound/melamine resin mass ratio | 100/0 | 100/0 | 60/40 | 100/0 | 100/0 | 100/0 |
| Hydroxyl group value of resin A | 250 | — | 250 | 250 | 250 | 250 |
| Hydroxyl group value of resin B | — | 150 | 150 | 40 | 230 | 150 |
| Amount of caprolactone structural units in resin A (mass %) | 16.6 | — | 16.6 | 16.6 | 16.6 | 16.6 |
| Amount of caprolactone structural units in resin B (mass %) | — | 36.9 | 36.9 | 36.9 | 36.9 | 18.4 |

TABLE 7

|  | Comparative Example 7 CC-14 | Comparative Example 8 CC-15 | Comparative Example 9 CC-16 | Comparative Example 10 CC-17 | Comparative Example 11 CC-18 | Comparative Example 12 CC-19 |
|---|---|---|---|---|---|---|
| Appearance | Δ | X | X | ○ | ○ | Δ |
| Hardness | Δ | ○ | X | Δ | Δ | ○ |
| Car-wash Damage Resistance | 5.6 | 20.2 | 5.4 | 6.3 | 6.8 | 16.2 |
| Acid Resistance | Δ | ○ | X | ○ | Δ | ○ |
| Staining Resistance | Δ | ○ | Δ | X | Δ | ○ |
| Water Resistance | 1.4 | 0.4 | 1.3 | 0.5 | 1 | 0.5 |
| Weather Resistance | No Abnormality | No Abnormality | No Abnormality | No Abnormality | No Abnormality | No Abnormality |
| Resin A | A-1 | A-2 | A-3 | A-4 | A-6 | A-5 |
| Resin B | B-7 | B-5 | B-7 | B-3 | B-1 | B-1 |
| Resin A/B Mass Ratio | 60/40 | 60/40 | 60/40 | 60/40 | 60/40 | 60/40 |
| Isocyanate compound/melamine resin mass ratio | 100/0 | 100/0 | 100/0 | 100/0 | 100/0 | 100/0 |
| Hydroxyl group value of resin A | 250 | 340 | 260 | 150 | 250 | 420 |
| Hydroxyl group value of resin B | 60 | 230 | 60 | 180 | 150 | 150 |
| Amount of caprolactone structural units in resin A (mass %) | 16.6 | 18.4 | 24 | 10 | 33 | 15 |
| Amount of caprolactone structural units in resin B (mass %) | 80.9 | 36.9 | 80.9 | 36.9 | 36.9 | 36.9 |

The invention claimed is:

1. A paint composition, comprising:
   a hydroxyl group containing resin (A), comprising structural units based on 2,2-dimethylolalkanoic acid, a hydroxyl group value of from 200 to 400 mgKOH/g, and less than 25 weight % in the resin solid fraction of structural units based on a lactone compound;
   a hydroxyl group containing resin (B), comprising a hydroxyl group value from 50 to 200 mgKOH/g, and from 25 to 75 weight % in the resin solid fraction of structural units based on a lactone compound; and
   a crosslinking agent (C) comprising at least two OH-reactive functional groups per molecule, wherein the crosslinking agent (C) is a combination of an isocyanate compound and melamine resin having a solid fraction mass ratio of from 100/0 to 75/25
   wherein the resin solid fraction weight ratio (A)/(B) of the hydroxyl group containing resin (A) and the hydroxyl group containing resin (B) is from 90/10 to 10/90.

2. The paint composition of claim 1, wherein at least 40% of the hydroxyl groups of the hydroxyl group containing resin (A) are hydroxyl groups of (a) a 2,2-dimethylolalkanoic acid, (b) hydroxyl groups produced by an addition reaction on an epoxy group containing radically polymerizable monomer or polymer of a hydroxyl group of a 2,2-dimethylolalkanoic acid, or (c) a combination thereof.

3. The paint composition of claim 1, wherein the 2,2-dimethylolalkanoic acid is 2,2-dimethylolbutanoic acid or 2,2-dimethylolpropionic acid.

4. The paint composition of claim 1, wherein the hydroxyl group containing resin (A) and the hydroxyl group containing resin (B) are acrylic resins of weight average molecular weight from 1,000 to 30,000.

5. The paint composition of claim 1, wherein the crosslinking agent (C) is an isocyanate compound, a melamine resin, or a combination thereof.

6. A method of paint finishing comprising applying the paint composition of claim 1.

7. A painted object comprising the paint composition of claim 1.

8. A paint composition, comprising:
A hydroxyl group containing resin (A), comprising structural units based on 2,2-dimethylolalkanoic acid, a hydroxyl group value of from 200 to 400 mgKOH/g, and less than 25 weight % in the resin solid fraction of structural units based on a lactone compound;
a hydroxyl group containing resin (B), comprising a hydroxyl group value from 50 to 190 mgKOH/g, and from 25 to 75 weight % in the resin solid fraction of structural units based on a lactone compound; and
a crosslinking agent (C) comprising at least two OH-reactive functional groups per molecule, wherein the crosslinking agent (C) is a combination of an isocyanate compound and melamine resin having a solid fraction mass ratio of from 100/0 to 75/25;
wherein at least 40% of the hydroxyl groups of the hydroxyl group containing resin (A) are hydroxyl groups of (a) a 2,2-dimethylolalkanoic acid, (b) hydroxyl groups produced by an addition reaction on an epoxy group containing radically polymerizable monomer or polymer of a hydroxyl group of a 2,2-dimethylolalkanoic acid, or (c) a combination thereof; and
wherein the resin solid fraction weight ratio (A)/(B) of the hydroxyl group containing resin (A) and the hydroxyl group containing resin (B) is from 80/20 to 40/60.

9. A paint composition, comprising:
A hydroxyl group containing acrylic resin (A), comprising structural units based on 2,2-dimethylolalkanoic acid, a hydroxyl group value of from at least about 250 to 400 mgKOH/g, and less than 25 weight % in the resin solid fraction of structural units based on a lactone compound;
a hydroxyl group containing acrylic resin (B), comprising a hydroxyl group value from 50 to 190 mgKOH/g, and from 25 to 75 weight % in the resin solid fraction of structural units based on a lactone compound, wherein the hydroxyl group containing resin (A) and the hydroxyl group containing resin (B) are acrylic resins of weight average molecular weight from 1,000 to 30,000; and
a crosslinking agent (C) comprising at least two OH-reactive functional groups per molecule, wherein the crosslinking agent (C) is a combination of an isocyanate compound and melamine resin having a solid fraction mass ratio of from 100/0 to 75/25;
wherein the resin solid fraction weight ratio (A)/(B) of the hydroxyl group containing resin (A) and the hydroxyl group containing resin (B) is from 80/20 to 40/60;
wherein at least 40% of the hydroxyl groups of the hydroxyl group containing resin (A) are hydroxyl groups of (a) a 2,2-dimethylolalkanoic acid, (b) hydroxyl groups produced by an addition reaction on an epoxy group containing radically polymerizable monomer or polymer of a hydroxyl group of a 2,2-dimethylolalkanoic acid, or (c) a combination thereof; and
wherein the 2,2-dimethylolalkanoic acid is 2,2-dimethylolbutanoic acid or 2,2-dimethylolpropionic acid.

* * * * *